United States Patent
Choi et al.

(10) Patent No.: US 8,144,603 B2
(45) Date of Patent: Mar. 27, 2012

(54) APPARATUSES AND METHODS FOR DETECTING ANOMALOUS EVENT IN NETWORK

(75) Inventors: Hyoung-Kee Choi, Seoul (KR); Chan-Kyu Han, Seoul (KR)

(73) Assignee: Sungkyunkwan University Foundation For Corporate Collaboration, Gyeonggi-do (KR)

(\*) Notice: Subject to any disclaimer, the term of this patent is extended or adjusted under 35 U.S.C. 154(b) by 289 days.

(21) Appl. No.: 12/685,736

(22) Filed: Jan. 12, 2010

(65) Prior Publication Data

US 2011/0141915 A1 Jun. 16, 2011

(30) Foreign Application Priority Data

Dec. 14, 2009 (KR) ........................ 10-2009-0123784

(51) Int. Cl.
*H04L 1/00* (2006.01)
(52) U.S. Cl. ...................................................... 370/242
(58) Field of Classification Search .................. None
See application file for complete search history.

(56) References Cited

U.S. PATENT DOCUMENTS

2010/0284282 A1\* 11/2010 Golic ........................ 370/242

OTHER PUBLICATIONS

Chan-Kyu Han and Hyoung-Kee Choi, "An Anomalous Event Detection System based on Information Theory," Jun. 15, 2009.

\* cited by examiner

*Primary Examiner* — Jianye Wu
(74) *Attorney, Agent, or Firm* — Harness, Dickey & Pierce, PLC

(57) ABSTRACT

IP state-vector manager determines state vector value by updating token numbers of IP state vector according to source and destination IP addresses of the received packet, and obtains state number of state vector value by counting state vector value. Port-number state-vector manager determines state vector value by updating token numbers of port-number state vector according to source and destination token numbers of packet, and obtains state number of state vector value by counting state vector value. Entropy calculator calculates entropies related to IP address and port number, based on number and state number of state vector values related to IP state vector and port-number state vector. Anomalous event determiner determines whether there is anomalous event in network based on calculated entropies. Anomalous event can be efficiently detected with minimized false negative and positive rates.

18 Claims, 8 Drawing Sheets

(a)

(b)

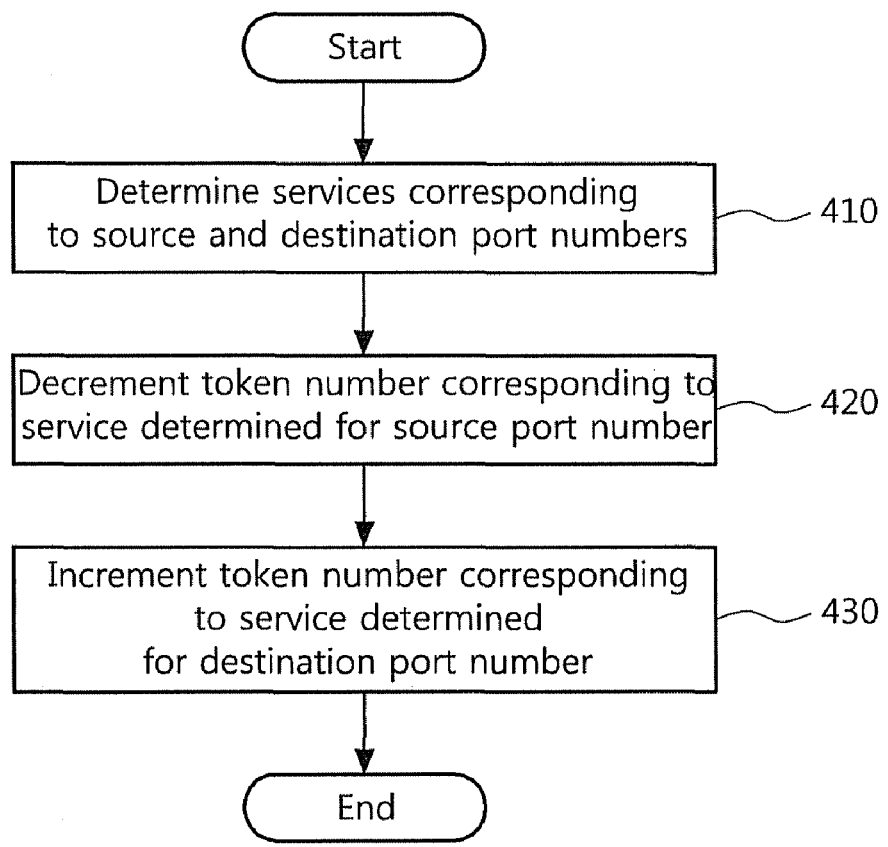

APPARATUSES AND METHODS FOR DETECTING ANOMALOUS EVENT IN NETWORK

CLAIM FOR PRIORITY

This application claims priority to Korean Patent Application No. 10-2009-123784 filed on Dec. 14, 2009 in the Korean Intellectual Property Office (KIPO), the entire contents of which are hereby incorporated by reference.

BACKGROUND

1. Technical Field

Example embodiments of the present invention relate to an apparatuses and methods for detecting an anomalous event in a network.

2. Related Art

Network attacks, such as Internet worms, scanning, and a denial of service (DoS) attacks, cause waste of network resources, which degrades a quality of service and a level of security provided to users. Representative events include an event in which famous websites such as Amazon, CNN, Yahoo, and Ebay were paralyzed in 2000, and an event in which routers connected to a Microsoft domain name system (DNS) server were subjected to a distributed DoS attack and web access service was paralyzed for some time due to overload of the routers in 2001. Accordingly, it is necessary to develop a scheme of detecting the network attacks with high accuracy.

An anomalous event refers to a traffic property that may be extracted from a series of processes and results of network attacks. Examples of the anomalous event include high bandwidth, distribution of Internet protocol (IP) addresses or port numbers different from those of normal traffic, etc. The anomalous event provides a suitable clue in detecting network attacks. Accordingly, detection of such an anomalous event with high accuracy may contribute to rapidly coping with network attacks.

A number of schemes of efficiently detecting an anomalous event have been proposed. Prior research has focused on observing a traffic volume and determining that there is an anomalous event when a characteristic change appears in the traffic volume. The traffic volume refers to data obtained by sequentially observing a packet number per unit time, a change of a packet size per unit time, or the like. Representative research includes a scheme of detecting an anomalous event using time series prediction, principal component analysis, and signal analysis. This scheme exhibits high negative and positive rates or high temporal complexity.

SUMMARY

Accordingly, example embodiments of the present invention are provided to substantially obviate one or more problems due to limitations and disadvantages of the related art.

Example embodiments of the present invention provide an apparatus and method for detecting an anomalous event in consideration of movement dynamics of a packet in order to efficiently detect the anomalous event with minimized false negative and positive rates.

In some example embodiments, an apparatus for detecting an anomalous event in a network includes a packet receiver configured to receive a packet; a packet analyzer configured to analyze the packet and obtain source and destination Internet protocol (IP) addresses of the packet; an IP state-vector manager configured to allocate prescribed token numbers to a system and an ambient environment discriminated by the IP addresses, define an IP state vector having the token numbers as elements, determine a state vector value by updating the token numbers of the IP state vector according to the source and destination IP addresses of the packet, and obtain a state number of the state vector value by counting the state vector value; a port-number state-vector manager configured to allocate prescribed token numbers to services discriminated by port numbers, define a port-number state vector having the token numbers as elements, determine a state vector value by updating the token numbers of the port-number state vector according to the source and destination token numbers of the packet, and obtain a state number of the state vector value by counting the state vector value; an entropy calculator configured to calculate entropies related to the IP address and the port number, based on the number and the state number of the state vector values related to the IP state vector and the port-number state vector; and an anomalous event determiner configured to determine whether there is an anomalous event in the network based on the calculated entropies.

The IP state-vector manager may output the number and the state number of the state vector values per prescribed unit time.

The port-number state-vector manager may output the number and the state number of the state vector values per prescribed unit time.

The entropy calculator may calculate the entropies related to the IP address and the port number using the following equation:

$$Entropy_t = -\sum_{i=1}^{m_t} p_i \log p_i \text{ where } p_i = \frac{d_i}{\sum_{i=1}^{m_t} d_i}, \text{ and}$$

In the equation, entropy in a t-th period is $Entropy_t$, $d_i$ denotes a state number of an i-th state vector value, and $m_t$ denotes a total number of state vector values recorded for a unit time t.

The IP state-vector manager may decrement the token number of the state vector corresponding to the source IP address of the packet, and increment the token number of the state vector corresponding to the destination IP address of the packet.

The port-number state-vector manager may determine services corresponding to the source and destination port numbers of the packet, decrement the token number corresponding to the service determined for the source port number, and increment the token number corresponding to the service determined for the destination port number.

For the entropy of the IP address and the entropy of the port number, the anomalous event determiner may obtain an absolute value of a difference between an average value of the entropy in a k-th unit time and an average value of the entropy until a (k−1)-th unit time using the following equation, and determine that there is an anomalous event when a smaller of the absolute values exceeds a predetermined threshold value:

$$\min\left(\left|\frac{\sum_{i=1}^{k} E_{1i}}{k} - \frac{\sum_{i=1}^{k-1} E_{1i}}{k-1}\right|, \left|\frac{\sum_{i=1}^{k} E_{2i}}{k} - \frac{\sum_{i=1}^{k-1} E_{1i}}{k-1}\right|\right) \geq R$$

where $E_{1i}$ denotes entropy of an IP address observed in an i-th unit time, $E_{2i}$ denotes entropy of a port number observed in an i-th unit time, and R denotes a predetermined threshold value.

The apparatus may be embodied on a firewall.

The services discriminated by the port numbers may include interactive service, interactive bulk service, asynchronous service and user ephemeral service.

In other example embodiments, a method of detecting an anomalous event in a network includes allocating prescribed token numbers to a system and an ambient environment discriminated by IP addresses and defining an IP state vector having the token numbers as elements; allocating prescribed token numbers to services discriminated by port numbers and defining a port-number state vector having the token numbers as elements; when a packet moves, analyzing the packet and obtaining source and destination IP addresses of the packet and source and destination port numbers of the packet; determining a state vector value by updating the token numbers of the IP state vectors according to the source and destination IP addresses of the packet and the source and destination port numbers of the packet; obtaining a state number of the state vector values related to the IP address and the port number by counting the state vector values related to the IP address and the port number; calculating entropies related to the IP address and the port number, based on the number and the state number of the state vector values related to the IP state vector and the port number; and determining whether there is an anomalous event in the network based on the calculated entropies.

The number and the state number of the state vector values related to the IP address may be obtained per predetermined time unit.

The number and the state number of the state vector values related to the port number may be obtained per predetermined time unit.

The entropies may be calculated using the following equation:

$$Entropy_t = -\sum_{i=1}^{m_t} p_i \log p_i \text{ where } p_i = \frac{d_i}{\sum_{i=1}^{m_t} d_i}, \text{ and}$$

In the equation, entropy in a t-th period is $Entropy_t$, $d_i$ denotes a state number of an i-th state vector value, and $m_t$ denotes a total number of state vector values recorded for a unit time t.

The token numbers of the state vector related to the IP address may be updated by decrementing the token number of the state vector corresponding to the source IP address of the packet and incrementing the token number of the state vector corresponding to the destination IP address of the packet.

The token numbers of the state vector related to the port number may be updated by determining services corresponding to the source and destination port numbers of the packet, decrementing the token number corresponding to the service determined for the source port number, and incrementing the token number corresponding to the service determined for the destination port number.

For the entropy of the IP address and the entropy of the port number, an absolute value of a difference between an average value of the entropy in a k-th unit time and an average value of the entropy until a (k−1)-th unit time may be obtained using the following equation, and it may be determined that there is an anomalous event when a smaller of the absolute values exceeds a predetermined threshold value:

$$\min\left(\left|\frac{\sum_{i=1}^{k}E_{1i}}{k} - \frac{\sum_{i=1}^{k-1}E_{1i}}{k-1}\right|, \left|\frac{\sum_{i=1}^{k}E_{2i}}{k} - \frac{\sum_{i=1}^{k-1}E_{1i}}{k-1}\right|\right) \geq R$$

where $E_{1i}$ denotes entropy of an IP address observed in an i-th unit time, and $E_{2i}$ denotes entropy of a port number observed in an i-th unit time.

The method may be embodied on a firewall.

The services discriminated by the port numbers may include interactive service, interactive bulk service, asynchronous service and user ephemeral service.

BRIEF DESCRIPTION OF DRAWINGS

Example embodiments of the present invention will become more apparent by describing in detail example embodiments of the present invention with reference to the accompanying drawings, in which:

FIG. 8 illustrates a method of changing token numbers of the state vector based on port numbers according to an example embodiment of the present invention.

DESCRIPTION OF EXAMPLE EMBODIMENTS OF THE PRESENT INVENTION

Figure 1:
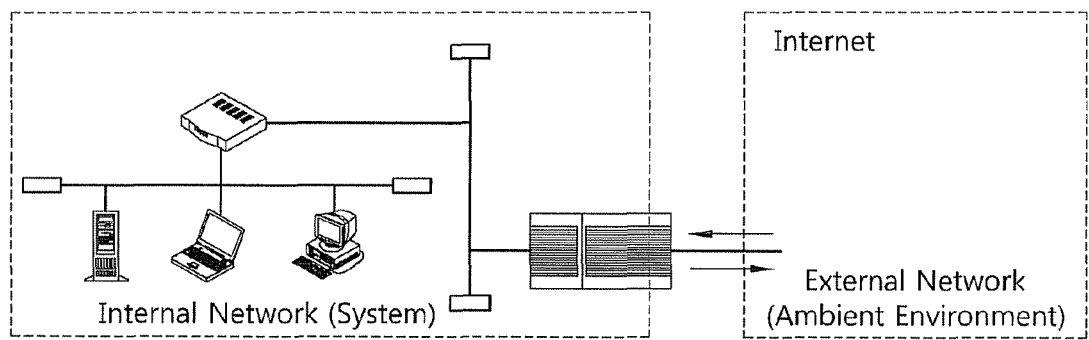
FIG. 1 illustrates an example in which a system and an ambient environment are discriminated based on an Internet protocol (IP) address according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of the present invention propose an algorithm suitable for anomalous event detection by applying a thermodynamic theory. Packet exchange between hosts on a network is similar to material exchange between a system and an ambient environment in a thermodynamic theory. In example embodiments of the present invention, concepts of a thermodynamic system and an ambient environment are introduced to discriminate between networks and material communicated between the system and the ambient environment is defined as a packet. Using a thermodynamic theory that entropy increases when a rapid change occurs in a material distribution of the system and the ambient environment, an anomalous event is detected.

The entropy is a concept used in thermodynamics and is a numerical value for measuring the extent of disorder in a system. When an element having a distribution different from a current distribution in the system is input or output, the entropy rapidly increases. A distribution of traffic containing an anomalous event and a distribution of normal traffic greatly differ in bandwidth, an IP address, a port number, a packet number, and the like. For example, in case of a denial of service (DoS) attack, traffic is concentrated on an IP address as an attack object and a bandwidth use amount is increased. Since the entropy rapidly increases with occurrence of such an anomalous event, the anomalous event can be detected.

In example embodiments of the present invention, concepts of a "system" and an "ambient environment" are used to observe packet dynamics. The system and the ambient environment are discriminated based on an IP address and a port number.

FIG. 1 illustrates an example in which a system and an ambient environment are discriminated based on an Internet protocol (IP) address according to an example embodiment of the present invention.

When the IP address is used as a discrimination criterion, the system is defined as an internal network and the ambient environment is defined as an external network. The reason for defining the system and the ambient environment as the internal network and the external network based on the IP address is that a host that is an activity subject of a network can be identified by the IP address. A source of an anomalous event, i.e., a location of an attacker, can be recognized by discriminating the internal network and the external network based on the IP address. In the network, a material may be input and output between the system and the ambient environment through packets. As the system and the ambient environment exchange packets, the number of packets owned by the system changes. A determination as to whether the system is in a normal state may be made by observing the change of the packet number through entropy of the system.

Figure 2:
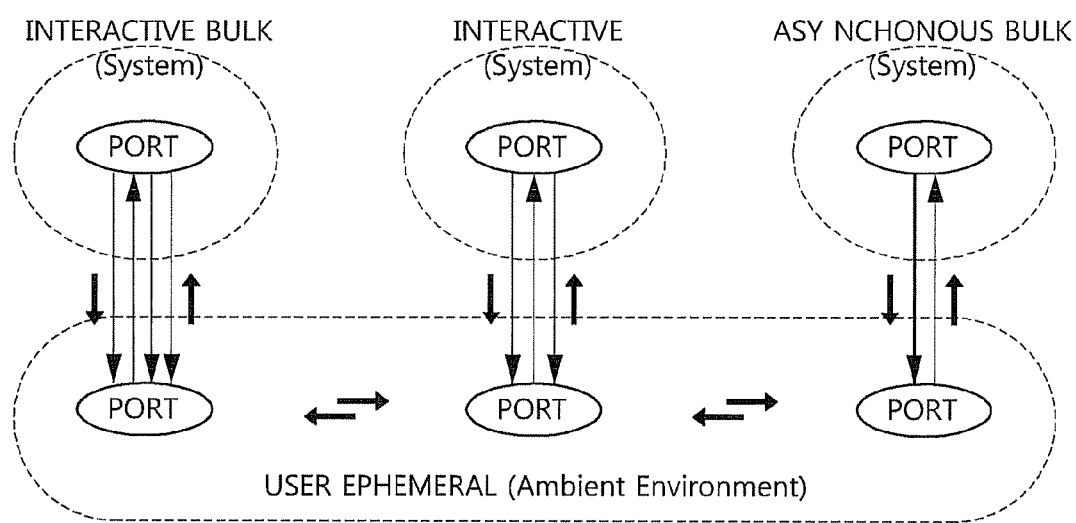
FIG. 2 illustrates an example in which systems and an ambient environment are discriminated based on a port number according to another example embodiment of the present invention.

FIG. 2 illustrates an example in which systems and an ambient environment are discriminated based on a port number according to another example embodiment of the present invention.

Detection of an anomalous event in each flow, rather than simple detection of an occurrence time of the anomalous event, is required to more effectively cope with an anomalous event. For example, when a worm virus attacking a specific weak place appears, it is necessary to recognize a weak service and a flow to which the weak service belongs, rather than an occurrence time. Accordingly, it is possible to accurately detect a type of a current anomalous event by recognizing and analyzing a flow in which the anomalous event appears. However, when the system and the ambient environment are discriminated using the IP address, it is difficult to detect an anomalous event in each flow.

In another example embodiment of the present invention, the system and the ambient environment are discriminated based on a port number, as in FIG. 2. When the port number is used as the discrimination criterion, three services: interactive service, interactive bulk service and asynchronous service, are defined as systems, and a user ephemeral service is defined as an ambient environment.

The reason for using the port number as the discrimination criterion is that a network attack is generally performed against weak service and a factor for discriminating between services is the port number. Since services are defined as well-known port numbers, the services are defined as systems and a user ephemeral port number is defined as the ambient environment. In order to detect an anomalous event in each flow, properties of application services must be reflected and the application services may be discriminated so that the properties do not overlap between service categories. In view of the two conditions, port numbers are classified into an interactive service port, an interactive bulk service port, an asynchronous service port and a user ephemeral service port according to, for example, a RFC1633 service discrimination criterion.

First, the interactive service refers to traffic in which a request and a response interact in one-to-one correspondence in a state in which a session is established, like telnet or X-windows. Second, the interactive bulk service includes interaction, similar to the interactive service, but has a characteristic that a group of responses from a server are provided at once. Representative interactive bulk services include applications such as file transfer protocol (FTP) and hypertext transfer protocol (HTTP). Finally, the asynchronous service includes electronic mail in which a response may not be rapidly provided irrespective of a request.

Figure 3:
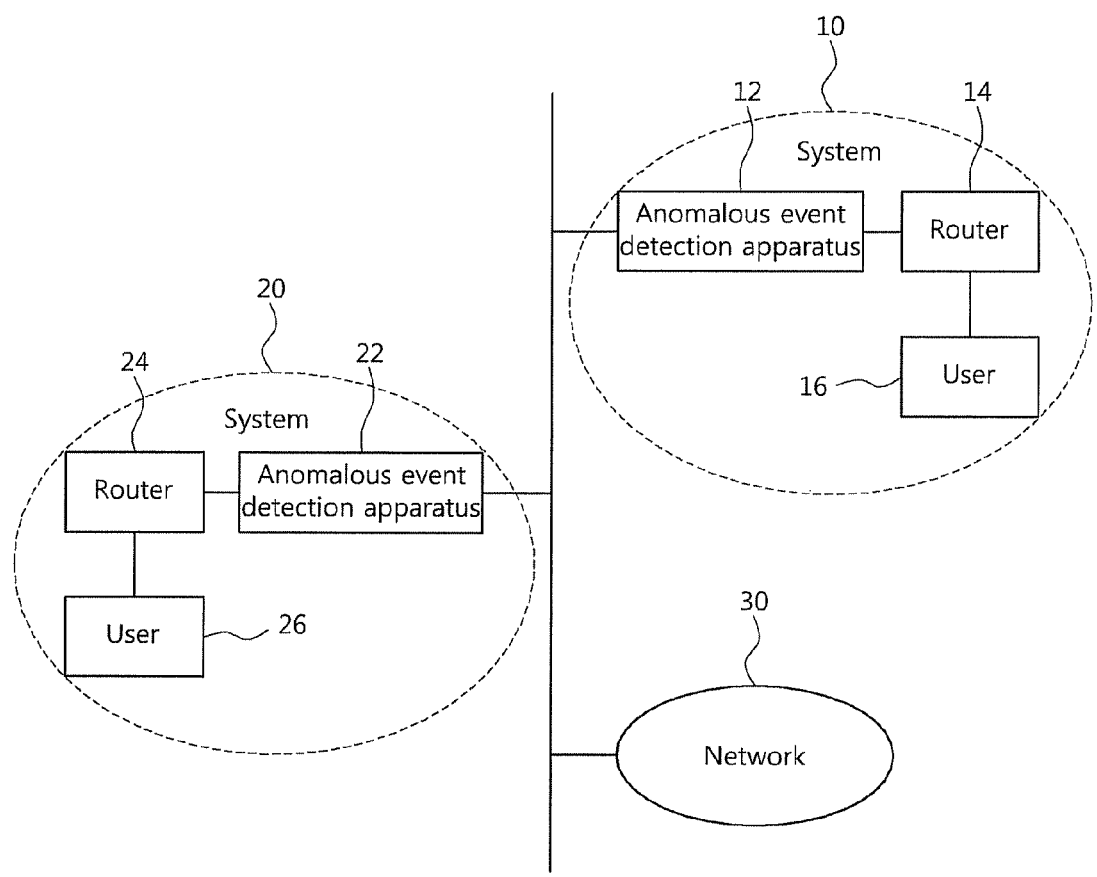
FIG. 3 is a diagram for explaining a location on a network of an apparatus for detecting an anomalous event in a network according to example embodiments of the present invention.

FIG. 3 is a diagram for explaining a location on a network of an apparatus for detecting an anomalous event in a network according to example embodiments of the present invention.

Anomalous event detection apparatuses 12 and 22 may be provided, for example, in systems 10 and 20 in which one or more user terminals 16 and 26 are connected via routers 14 and 24. The anomalous event detection apparatuses 12 and 24 receive packets communicated inside the systems 10 and 20, packets communicated between the system 20 or 10 and the other system 10 or 20 or a network 30, and packets communicated via the routers 14 and 24 on the network 30.

The anomalous event detection apparatuses 12 and 22, when receiving the packets, calculate entropies according to an IP address or a port number of the packets and determine whether there is an anomalous event in the network. The anomalous event detection apparatus may be embodied on a firewall using hardware or software by those skilled in the art.

Figure 4:
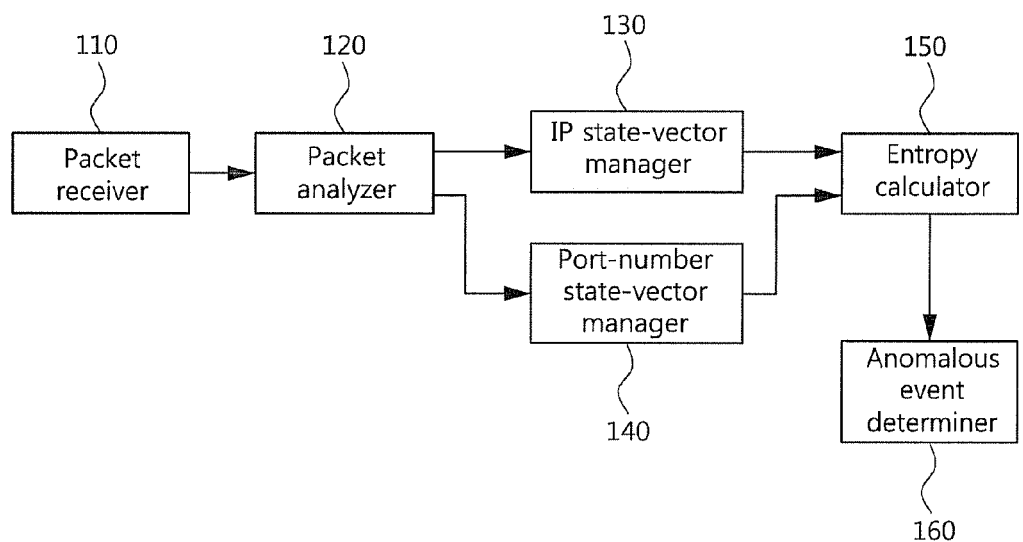
FIG. 4 is a block diagram of an anomalous event detection apparatus according to an example embodiment of the present invention.

FIG. 4 is a block diagram of an anomalous event detection apparatus according to an example embodiment of the present invention.

Referring to FIG. 4, an anomalous event detection apparatus includes a packet receiver 110, a packet analyzer 120, an IP state-vector manager 130, a port-number state-vector manager 140, an entropy calculator 150, and an anomalous event determiner 160.

The packet receiver 110 receives packets communicated in relation to a system to which the anomalous event detection apparatus belongs, and provides the received packets to the packet analyzer 120.

According to an example embodiment of the present invention, the packet analyzer 120 extracts source and destination IP addresses of the packets and provides the source and destination IP addresses to the IP state-vector manager 130. According to another example embodiment of the present invention, the packet analyzer 120 extracts source and destination port numbers of the packets and provides the source and destination port numbers to the port-number state-vector manager 140.

The IP state-vector manager 130 allocates prescribed token numbers to a system and an ambient environment discriminated by an IP address, and defines a state vector having the token numbers allocated to the system and the ambient environment, as elements. For example, when there are i tokens in the system and j tokens in the ambient environment, the state vector becomes (i, j).

The IP state-vector manager 130, when receiving the source and destination IP addresses of the packet from the packet analyzer 120, decrements the token number of the state vector corresponding to the source IP address by one and increments the token number corresponding to the destination IP by one. That is, the IP state-vector manager 130 decrements the token number of the state vector corresponding to the source IP address of the packet, and increments the token number of the state vector corresponding to the destination IP address of the packet. For example, when the source IP address corresponds to the system and the destination IP address corresponds to the ambient environment, the state vector changes, for example, from (i, j) to (i−1, j+1).

The IP state-vector manager 130 determines the state vector value by updating the token numbers of the state vector according to the source and destination IP addresses of the packet, and then counts the state vector value. That is, the IP state-vector manager 130 obtains a state number for state vector value (i−1, j+1).

If the state vector is, for example, (i, j) and one packet has moved from the system 10 to the system 10 or from the ambient environment 30 to the ambient environment 30, only one of the elements of the state vector is incremented or decremented, such that the state vector value again becomes (i, j). In this case, the IP state-vector manager 130 counts the state vector value (i, j) to obtain the state number.

As described above, each time the packet moves, the IP state-vector manager 130 increments or decrements the token numbers of the state vector according to the source and destination IP addresses of the packet, and obtains a state number of the resultant state vector value.

The IP state-vector manager 130 provides the state number of each state vector value to the entropy calculator 150 every prescribed time period. If the state vector value (i, j) appears k times in the prescribed time period and the state vector value (i−1, j+1) one time, the state numbers for (i, j) and (i−1, j+1) become k and 1, respectively.

For further description, it is assumed that there are a system X and an ambient environment Y. The system and the ambient environment have n tokens and accordingly an initial value of the state vector is (n, n). When it is assumed that there are packet movements X→Y, Y→X, and Y→Y between the system and the ambient environment, the state vectors are recorded as (n, n), (n−1, n+1), (n, n), and (n, n), including the initial value. Accordingly, the state number for (n, n) becomes 3 and the state number for (n−1, n+1) becomes 1.

Also, the port-number state-vector manager 140 allocates prescribed token numbers to services discriminated by the port number, and defines a state vector having the token numbers allocated to the services as elements. For example, the port-number state-vector manager 140 allocates token numbers to interactive service, interactive bulk service, asynchronous service and user ephemeral service, and generates the state vector having the token numbers as elements.

When the port-number state-vector manager 140 receives the source and destination port numbers of the packet from the packet analyzer 120, the port-number state-vector manager 140 determines service corresponding to the source and destination port numbers. As described above, the port numbers are classified according to services, and the state vector related to the port number has token numbers allocated to the services dependent on the port numbers as elements. According to an example embodiment of the present invention, the port number corresponds to one of four services: interactive service, interactive bulk service, asynchronous service and user ephemeral service. Accordingly, the state vector has four elements.

Accordingly, the port-number state-vector manager 140, when receiving the source and destination port numbers of the packet from the packet analyzer 120, determines services to which the received source and destination port numbers belong.

The port-number state-vector manager 140 then decrements the token number of the state vector corresponding to the service determined for the source port number by one and increments the token number corresponding to the service determined for the destination port number by one. That is, the port-number state-vector manager 140 decrements the token number of the service corresponding to the source port number and increments the token number of the state vector of the service corresponding to the destination port number.

That is, the port-number state-vector manager 140 determines a state vector value by changing the token numbers according to the source and destination port numbers.

The port-number state-vector manager 140 then counts the state vector value to obtain a state number of the state vector value. The port-number state-vector manager 140 provides the state numbers of each state vector value to the entropy calculator 150 every prescribed time period. If a state vector value (a, b, c, d) appears e times in the prescribed time period, a state vector value (a+1, b, c, d−1) appears f times and (a+1, b, c+1, d−2) appears g times, state numbers for (a, b, c, d), (a+1, b, c, d−1) and (a+1, b, c+1, d−2) become e, f, and g, respectively.

According to an example embodiment, the entropy calculator 150 receives the state numbers of the state vector values related to the IP address from the IP state-vector manager 130. According to another example embodiment, the entropy calculator 150 receives the state numbers of the state vector values related to the port number from the port-number state-vector manager 140. The entropy calculator 150 calculates a first entropy related to the IP address using the state vector values and the state numbers related to the IP address. Alternatively, the entropy calculator 150 calculates a second entropy related to the port number using the state vector values and the state numbers related to the port number.

Specifically, the entropy calculator 150 calculates the entropy using Equation 1.

$$Entropy_t = -\sum_{i=1}^{m_t} p_i \log p_i, \text{ where } p_i = \frac{d_i}{\sum_{i=1}^{m_t} d_i}.$$

Equation 1

In Equation 1, entropy in a t-th period is $Entropy_t$. $d_i$ denotes a state number of an i-th state vector value, and $m_t$ denotes a total number of state vector values recorded for the unit time t.

For example, when the state number of the state vector value (n, n) is 3 and the state number of the state vector value (n−1, n+1) is 1, the total number $m_t$ of the state vector values becomes 2 and respective probabilities become ¾ and ¼. In this case, the entropy may be calculated using Equation 2:

$$Entropy_t = -\sum_{i=1}^{2} p_i \log p_i$$
$$= -(3/4 \log 3/4 + 1/4 \log 1/4).$$

Equation 2

The entropy calculator 150 provides the first entropy related to the IP address and the second entropy related to the port number to the anomalous event determiner 160. The anomalous event determiner 160 determines whether there is an anomalous event in the network based on the first or second entropy.

In the example embodiments of the present invention, the reason for measuring the entropy in view of distributions of the number and the state number of the state vector values, as shown in Equation 1, will now be described.

Figure 5:
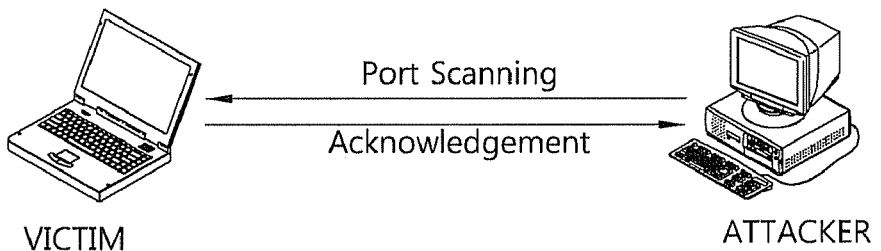
FIG. 5 is a diagram for explaining a property of an anomalous event.

FIG. 5 is a diagram for explaining a property of an anomalous event.

As shown in FIG. 5, when an attack object host is defined as a system and attackers including zombies are defined as an ambient environment, network attacks, i.e., anomalous events can be classified into two categories.

In a network attack such as distributed DoS attack in FIG. 5(*a*), packets are unidirectionally transmitted from the attackers to the attack object host. Statistics of state vector values shows that a variety of state vector values are evenly distributed. That is, in the distributed DoS attack, since a change width of tokens owned by the system and the ambient environment is great, the state number, which is a number of times the same state vector value is recorded, is small, but a plurality of state vectors are created In a network attack such as port scanning in FIG. 5(*b*), since an attacker and an attack object host transmit and receive packets in an interactive form, a few state vector values are concentrated. That is, in the port scanning, the change width of the tokens owned by the system and the ambient environment is small, but the state number, which is a number of times the same state vector value is recorded, has a great value. The anomalous event occurs in the form of increasing the number of state vectors as in FIG. 5a or the state number as in FIG. 5b. The anomalous event can be efficiently and more accurately detected by considering both probabilities of the number and the state number of the state vectors in Equation 1.

With conventional schemes, it is impossible to detect both a network attack such as distributed DoS and a network attack such as port scanning. Since the time series prediction scheme and the principal component analysis scheme detect the anomalous event based on a packet size (or a packet number) per unit time, the schemes can detect only the network attack such as a distributed DoS attack in which the packet size and the packet number per unit time increase rapidly. Since the network attack such as port scanning does not affect the packet size per unit time as much, a relative entropy scheme can detect only the network attack such as port scanning because only a flag and a destination port number in normal traffic are observation objects of entropy. In an example embodiment of the present invention, the token number changed as a packet exchanged between the system and the ambient environment moves is observed and represented as the state vector value, and a number of times each state vector value is recorded in the unit time is represented as the state number. An apparatus for detecting an anomalous event by measuring the probability of the state number through entropy is capable of detecting both categories of anomalous events, such as a distributed DoS attack and port scanning, and accordingly, is efficient.

In an example embodiment, the anomalous event determiner 160 determines whether there is an anomalous event in the network using Equation 3:

$$\min\left(\left|\frac{\sum_{i=1}^{k} E_{1i}}{k} - \frac{\sum_{i=1}^{k-1} E_{1i}}{k-1}\right|, \left|\frac{\sum_{i=1}^{k} E_{2i}}{k} - \frac{\sum_{i=1}^{k-1} E_{1i}}{k-1}\right|\right) \geq R,$$

Equation 3 where $E_{1i}$ denotes entropy of an IP address observed in an i-th unit time, and $E_{2i}$ denotes entropy of a port number observed in an i-th unit time.

When a current unit time is a k-th unit time and Equation 3 is satisfied, the anomalous event determiner 160 determines that there is an anomalous event. Here, a unit time t may be one second and may be set to any value according to implementations.

Specifically, for the entropies of the IP address and the port number, the anomalous event determiner 160 obtains an absolute value of a difference between an average value of the entropy in the k-th unit time and an average value of the entropy until the (k−1)-th unit time. When a smaller of the absolute values exceeds a threshold value R, the anomalous event determiner 160 determines that there is an anomalous event. The threshold value in Equation 3 is empirically determined to be 0.01, which can minimize false positives and false negatives of the anomalous event. However, the example embodiments of the present invention are not limited to a specific threshold value, e.g., 0.01, and may be determined empirically or mathematically by those skilled in the art.

A method of detecting an anomalous event performed in the anomalous event detection apparatus will now be described with reference to FIGS. 6 to 8.

Figure 6:
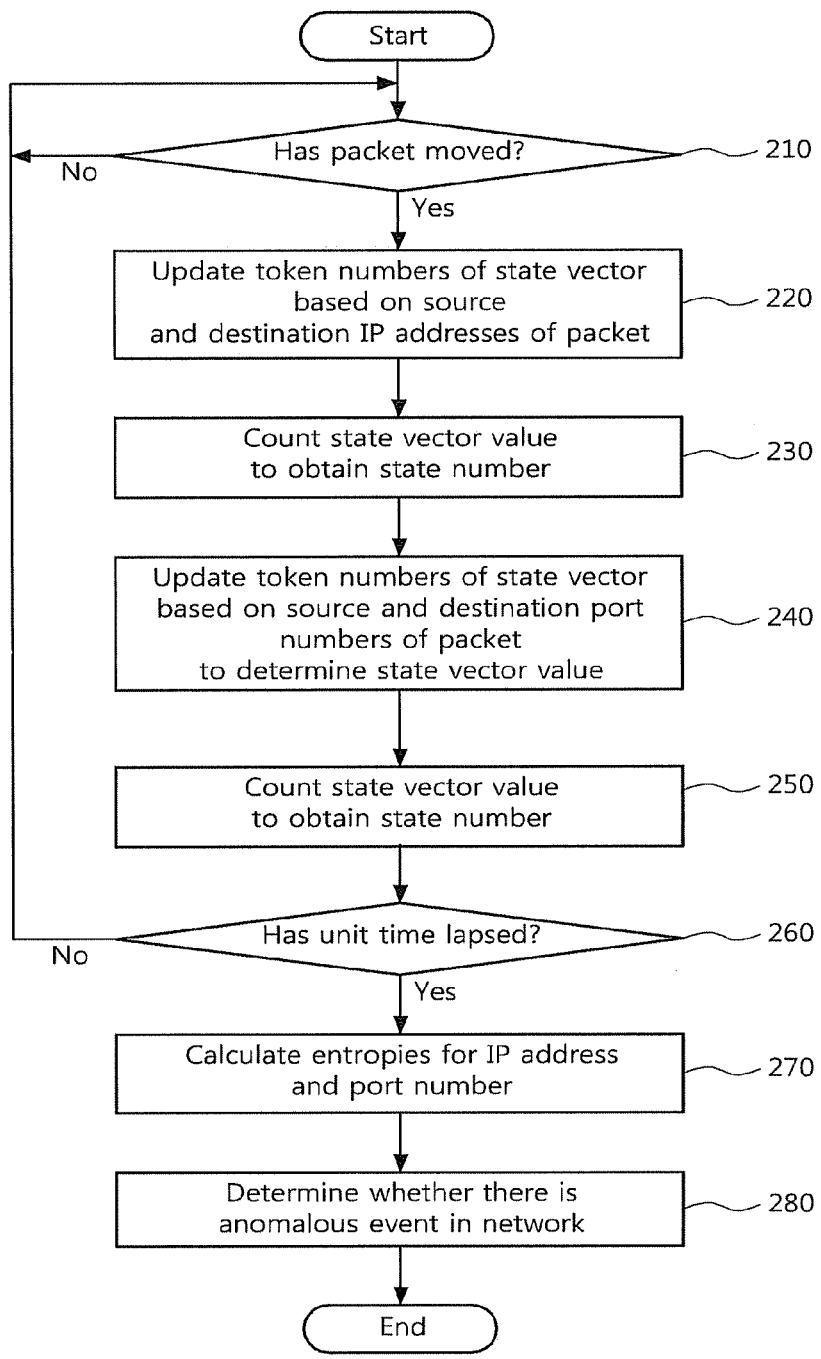
FIG. 6 illustrates a method of detecting an anomalous event according to an example embodiment of the present invention.

FIG. 6 illustrates a method of detecting an anomalous event according to an example embodiment of the present invention. In FIG. 6, the method of detecting an anomalous event is based on a premise that prescribed token numbers are allocated to the system and the ambient environment discriminated by IP addresses, and a state vector having the token numbers as elements is defined. Alternatively, the method of detecting an anomalous event in FIG. 6 is based on a premise that prescribed token numbers are allocated to services discriminated by port numbers, and a state vector having the token numbers as elements is defined.

The anomalous event detection apparatus determines whether a packet has moved (210). When the packet has moved, the anomalous event detection apparatus analyzes the packet and obtains source and destination IP addresses of the packet (not shown). The anomalous event detection apparatus then updates token numbers of the state vector based on the source and destination IP addresses of the packet (220).

As described above, in the example embodiment of the present invention, the prescribed token numbers are allocated to the system and the ambient environment discriminated by the IP addresses, and the state vector having the token numbers allocated to the system and the ambient environment as elements is defined. A method of changing the token numbers of the state vector based on the IP addresses is shown in FIG. 7.

Figure 7:
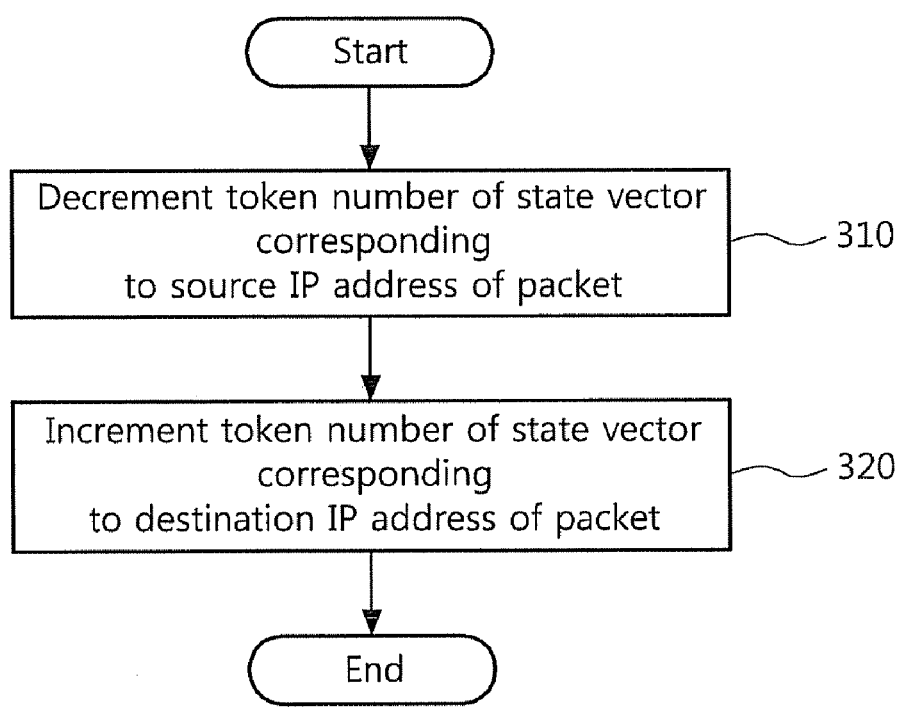
FIG. 7 illustrates a method of changing token numbers of a state vector based on IP addresses according to an example embodiment of the present invention.

Referring to FIG. 7, the anomalous event detection apparatus decrements a token number of the state vector corresponding to the source IP address by one, i.e., the token number of the state vector corresponding to the source IP address of the packet, based on the source and destination IP addresses of the packet (310). The anomalous event detection apparatus then increments the token number corresponding to the destination IP address by one, i.e., the token number of the state vector corresponding to the destination IP address of the packet (320).

As described above, when a packet has moved, the anomalous event detection apparatus updates the token numbers of the state vector based on the source and destination IP addresses of the packet (220). The anomalous event detection apparatus then counts the state vector value to obtain a state number (230).

When the packet has moved, the anomalous event detection apparatus updates the token numbers of the state vector based on the source and destination port numbers of the packet (240).

As described above, in the example embodiment of the present invention, the prescribed token numbers are allocated to the services discriminated by the port numbers, and the state vector having the token numbers allocated to the services as elements is defined. A method of changing the token numbers of the state vector based on the port numbers is shown in FIG. 8.

Referring to FIG. 8, the anomalous event detection apparatus determines services corresponding to the source and destination port numbers (410). As described above, the port numbers are classified according to services, and the state vectors related to the port numbers have the token numbers allocated to the services dependent on the port numbers as elements. According to an example embodiment of the present invention, the port number corresponds to one of four services: interactive service, interactive bulk service, asynchronous service and user ephemeral service. Thus, the state vector has four elements.

When the anomalous event detection apparatus receives the source and destination port numbers of the packet, the anomalous event detection apparatus determines services to which the received source and destination port numbers belong. The anomalous event detection apparatus then decrements the token number of the state vector corresponding to the service determined for the source port number by one, i.e., the token number of the service corresponding to the source port number (420). Also, the anomalous event detection apparatus increments the token number corresponding to the service determined for the destination port number by one, i.e., the token number of the state vector of the service corresponding to the destination port number (430).

As described above, when the packet has moved, the anomalous event detection apparatus updates the token numbers of the state vector based on the source and destination port numbers of the packet (240). The anomalous event detection apparatus then counts the state vector value to obtain a state number (250).

The anomalous event detection apparatus then determines whether the unit time has lapsed (260). When the unit time has lapsed, the anomalous event detection apparatus calculates a first entropy related to the IP address using the state numbers of the state vector values related to the IP address (270). In other example embodiments, when the unit time has lapsed, the anomalous event detection apparatus calculates a second entropy related to the port number using the state vector values and the state numbers related to the port number (270).

The anomalous event detection apparatus determines whether there is an anomalous event in the network, based on the entropies calculated in relation to the IP address or the port number (280). Specifically, for the entropy of the IP address and the entropy of the port number, the anomalous event detection apparatus obtains an absolute value of a difference between an average value of the entropy until a predetermined unit time and an average value of the entropies until a previous unit time. The anomalous event detection apparatus determines that there is an anomalous event when a smaller of the obtained absolute values exceeds a threshold value R.

In an example embodiment of the present invention, a method and apparatus of observing packet dynamics and measuring a property of the packet dynamics through entropy to detect an anomalous event in the network are to provided. When the anomalous event occurs, movement dynamics of the packet rapidly change, unlike in a normal case, and the anomalous event can be detected with a higher accuracy by considering the movement dynamics of the packet. Accordingly, false positive and negative rates can be greatly reduced in detecting the anomalous event.

While the example embodiments of the present invention and their advantages have been described in detail, it should be understood that various changes, substitutions and alterations may be made herein without departing from the scope of the invention.

What is claimed is:

1. An apparatus for detecting an anomalous event in a network, the apparatus comprising:
   a packet receiver configured to receive a packet;

a packet analyzer configured to analyze the packet and obtain source and destination Internet protocol (IP) addresses of the packet;

an IP state-vector manager configured to allocate prescribed token numbers to a system and an ambient environment discriminated by the IP addresses, define an IP state vector having the token numbers as elements, determine a state vector value by updating the token numbers of the IP state vector according to the source and destination IP addresses of the packet, and obtain a state number of the state vector value by counting the state vector value;

a port-number state-vector manager configured to allocate prescribed token numbers to services discriminated by port numbers, define a port-number state vector having the token numbers as elements, determine a state vector value by updating the token numbers of the port-number state vector according to the source and destination token numbers of the packet, and obtain a state number of the state vector value by counting the state vector value;

an entropy calculator configured to calculate entropies related to the IP address and the port number, based on the number and the state number of the state vector values related to the IP state vector and the port-number state vector; and an anomalous event determiner configured to determine whether there is an anomalous event in the network based on the calculated entropies.

2. The apparatus of claim 1, wherein the IP state-vector manager outputs the number and the state number of the state vector values per prescribed unit time.

3. The apparatus of claim 2, wherein the port-number state-vector manager outputs the number and the state number of the state vector values per prescribed unit time.

4. The apparatus of claim 3, wherein the entropy calculator calculates the entropies related to the IP address and the port number using the following equation:

$$Entropy_t = -\sum_{i=1}^{m_t} p_i \log p_i \text{ where } p_i = \frac{d_i}{\Box} \sum_{i=1}^{m_t} d_i, \text{ and}$$

in the equation, entropy in a t-th period is $Entropy_t$, $d_i$ denotes a state number of an i-th state vector value, and $m_t$ denotes a total number of state vector values recorded for a unit time t.

5. The apparatus of claim 1, wherein the IP state-vector manager decrements the token number of the state vector corresponding to the source IP address of the packet, and increments the token number of the state vector corresponding to the destination IP address of the packet.

6. The apparatus of claim 1, wherein the port-number state-vector manager determines services corresponding to the source and destination port numbers of the packet, decrements the token number corresponding to the service determined for the source port number, and increments the token number corresponding to the service determined for the destination port number.

7. The apparatus of claim 4, wherein for the entropy of the IP address and the entropy of the port number, the anomalous event determiner obtains an absolute value of a difference between an average value of the entropy in a k-th unit time and an average value of the entropy until a (k−1)-th unit time using the following equation, and determines that there is an anomalous event when a smaller of the absolute values exceeds a predetermined threshold value:

$$\min\left(\left|\frac{\sum_{i=1}^{k} E_{1i}}{k} - \frac{\sum_{i=1}^{k-1} E_{1i}}{k-1}\right|, \left|\frac{\sum_{i=1}^{k} E_{2i}}{k} - \frac{\sum_{i=1}^{k-1} E_{1i}}{k-1}\right|\right) \geq R$$

where $E_{1i}$ denotes entropy of an IP address observed in an i-th unit time, $E_{2i}$ denotes entropy of a port number observed in an i-th unit time, and R denotes a predetermined threshold value.

8. The apparatus of claim 1, wherein the apparatus is embodied on a firewall.

9. The apparatus of claim 1, wherein the services discriminated by the port numbers include interactive service, interactive bulk service, asynchronous service and user ephemeral service.

10. A method of detecting an anomalous event in a network, the method comprising:

allocating prescribed token numbers to a system and an ambient environment discriminated by IP addresses and defining an IP state vector having the token numbers as elements;

allocating prescribed token numbers to services discriminated by port numbers and defining a port-number state vector having the token numbers as elements;

when a packet moves, analyzing the packet and obtaining source and destination IP addresses of the packet and source and destination port numbers of to the packet;

determining a state vector value by updating the token numbers of the IP state vectors according to the source and destination IP addresses of the packet and the source and destination port numbers of the packet;

obtaining a state number of the state vector values related to the IP address and the port number by counting the state vector values related to the IP address and the port number;

calculating entropies related to the IP address and the port number, based on the number and the state number of the state vector values related to the IP state vector and the port number; and determining whether there is an anomalous event in the network based on the calculated entropies.

11. The method of claim 10, wherein the number and the state number of the state vector values related to the IP address are obtained per predetermined time unit.

12. The method of claim 11, wherein the number and the state number of the state vector values related to the port number are obtained per predetermined time unit.

13. The method of claim 12, wherein the entropies are calculated using the following equation:

$$Entropy_t = -\sum_{i=1}^{m_t} p_i \log p_i \text{ where } p_i = \frac{d_i}{\Box} \sum_{i=1}^{m_t} d_i, \text{ and}$$

in the equation, entropy in a t-th period is $Entropy_t$, $d_i$ denotes a state number of an i-th state vector value, and $m_t$ denotes a total number of state vector values recorded for a unit time t.

14. The method of claim 10, wherein the token numbers of the state vector related to the IP address are updated by decrementing the token number of the state vector corresponding to the source IP address of the packet and incrementing the token number of the state vector corresponding to the destination IP address of the packet.

15. The method of claim 10, wherein the token numbers of the state vector related to the port number are updated by determining services corresponding to the source and destination port numbers of the packet, decrementing the token number corresponding to the service determined for the source port number, and incrementing the token number corresponding to the service determined for the destination port number.

16. The method of claim 13, wherein for the entropy of the IP address and the entropy of the port number, an absolute value of a difference between an average value of the entropy in a k-th unit time and an average value of the entropy until a (k−1)-th unit time is obtained using the following equation, and it is determined that there is an anomalous event when a smaller of the absolute values exceeds a predetermined threshold value:

$$\min\left(\left|\frac{\sum_{i=1}^{k} E_{1i}}{k} - \frac{\sum_{i=1}^{k-1} E_{1i}}{k-1}\right|, \left|\frac{\sum_{i=1}^{k} E_{2i}}{k} - \frac{\sum_{i=1}^{k-1} E_{1i}}{k-1}\right|\right) \geq R$$

where $E_{1i}$ denotes entropy of an IP address observed in an i-th unit time, and $E_{2i}$ denotes entropy of a port number observed in an i-th unit time.

17. The method of claim 10, wherein the method is embodied on a firewall.

18. The method of claim 10, wherein the services discriminated by the port numbers include interactive service, interactive bulk service, asynchronous service and user ephemeral service.

* * * * *